June 21, 1932.  D. B. PERRY  1,863,606
DRIVE CHAIN
Filed June 19, 1931  2 Sheets-Sheet 1
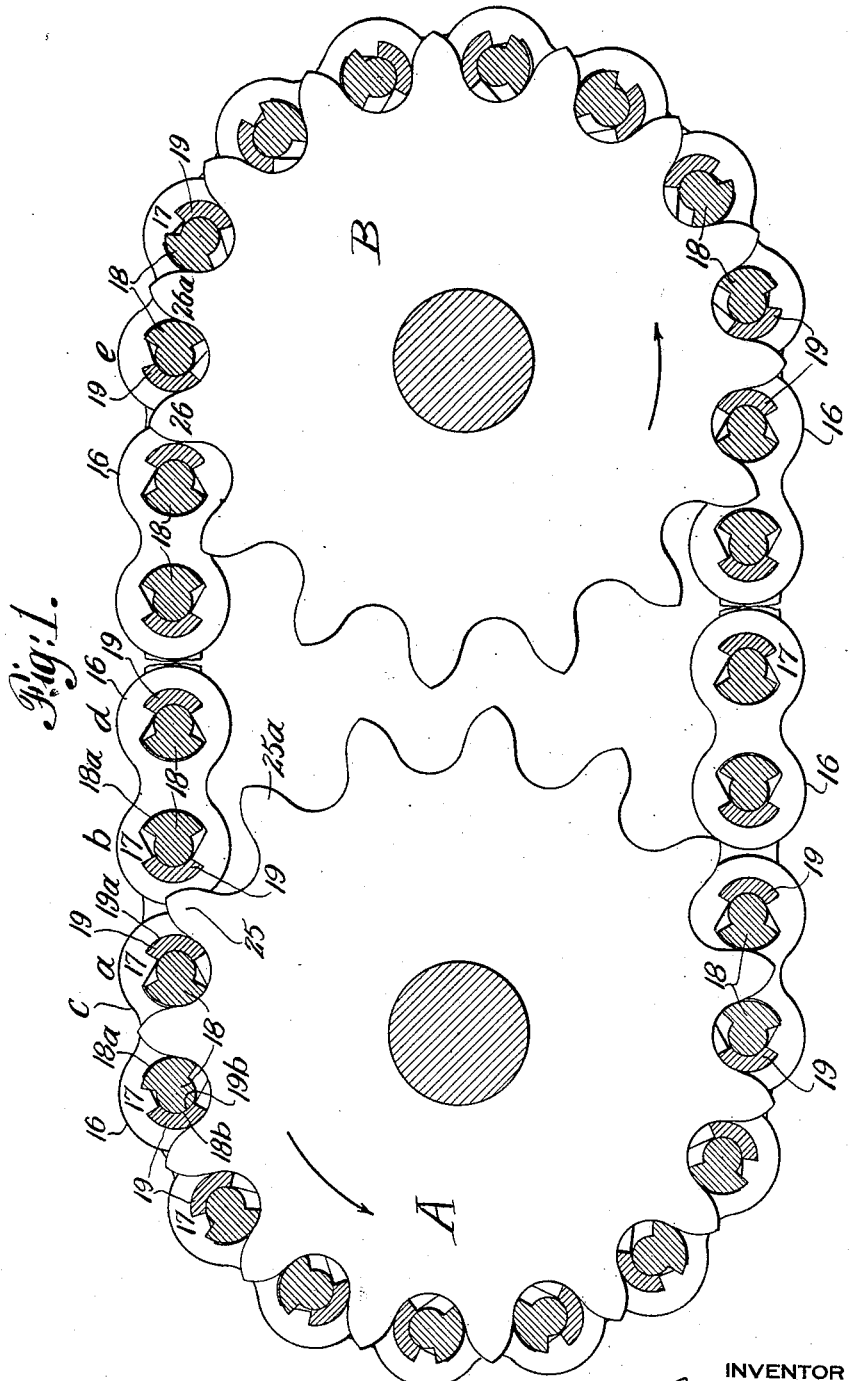
INVENTOR
David Barnes Perry
BY
Synnestvedt & Lechner
ATTORNEYS June 21, 1932. D. B. PERRY 1,863,606
DRIVE CHAIN
Filed June 19, 1931 2 Sheets-Sheet 2
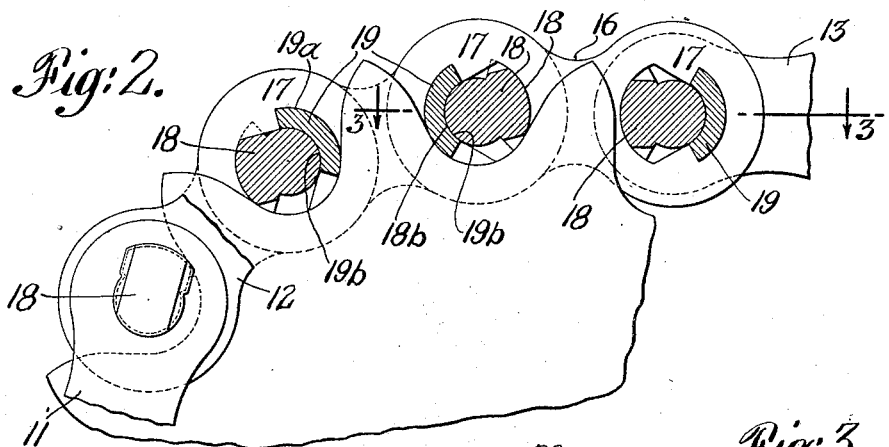
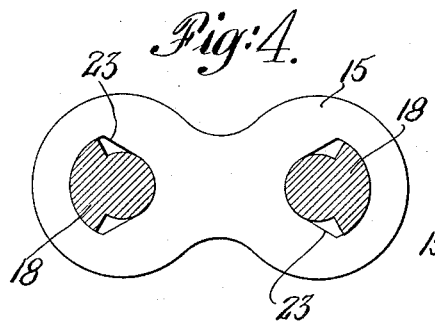
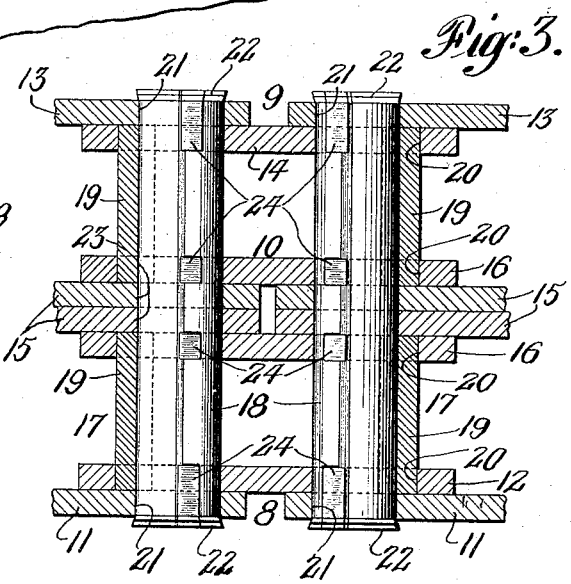
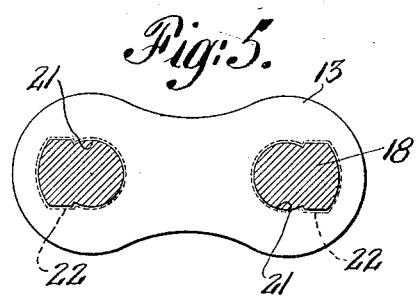
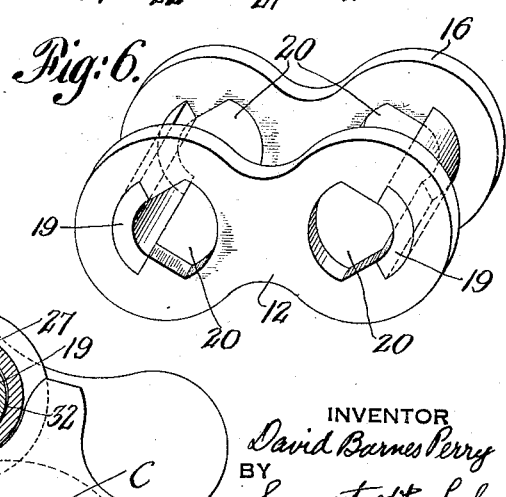
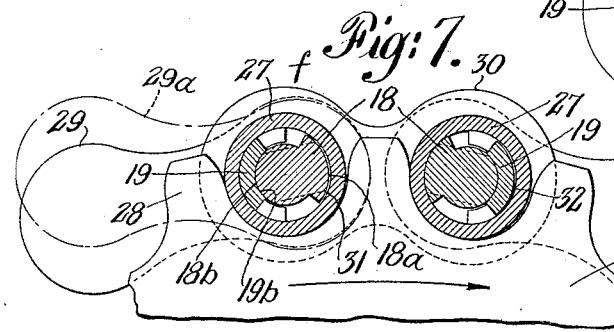
INVENTOR
David Barnes Perry
BY
Symmestvedt + Lechner
ATTORNEYS Patented June 21, 1932

1,863,606

UNITED STATES PATENT OFFICE

DAVID BARNES PERRY, OF ITHACA, NEW YORK, ASSIGNOR TO MORSE CHAIN COMPANY, OF ITHACA, NEW YORK, A CORPORATION OF NEW YORK

DRIVE CHAIN

Application filed June 19, 1931. Serial No. 545,397.

This invention relates to drive chains and particularly to chains of the type in which the sprocket teeth directly engage the pintles of the chain. Certain objects and advantages of the invention will be clear from the following:

In this type of chain it has been the practice to employ cylindrical bushings surrounding round pins of the chain with the bushings rigidly secured or pressed in every other link and the pins rigidly secured in the remaining connecting links. In such chains the contact of the bushings with the sprocket teeth, as the chain goes on and off both the driving and driven sprocket wheels, is such that alternate bushings must turn against the sprocket teeth under load. In other words, the joints so function that when the bushings are turned on the pins they must slide against the sprocket teeth under load. This not only causes noise but also causes considerable wear of the sprocket teeth, and of the bushings particularly at high speeds. Examination of sprocket wheels employed with such chains shows that heavy wear takes place on every other tooth of the sprocket.

Through my invention I overcome the above and provide not only a very quiet running chain but one in which the objectionable wear mentioned does not take place.

I propose to provide a chain of the general type mentioned in which the joints or pintles are of such construction and arrangement that there is no turning or rubbing of pintle parts on sprocket teeth under load. In other words all turning of pintle parts, when the chain bends on entering or leaving either the driving or driven sprocket wheels takes place under conditions of no load on sprocket teeth. It is proposed in some instances to have each joint comprise two pintle parts, one in the nature of a pin and the other in the nature of a segmental bushing. I also contemplate surrounding these parts with a tubular roller. The joint is of such arrangement that wear on the inside surface of the roller is materially reduced over that which takes place in roller type chains heretofore employed.

The primary object of my invention is the provision of a chain in which difficulties such as mentioned above are overcome.

How the foregoing, together with such other objects and advantages, as may hereinafter appear, or are incident to my invention, are realized, is illustrated in preferred form in the accompanying drawings wherein Figure 1 is a side elevational view illustrating my improved chain with the joints shown in section.

Figure 2 is an enlarged fragmentary view of my improved chain with certain of the joints shown in section.

Figure 3 is a plan section taken substantially on the line 3—3 of Figure 2 with the pintle parts of the joints shown in elevation.

Figure 4 is a face view of an intermediate link with the pintle pins shown in section.

Figure 5 is a face view of the outside link showing the pintle pins in section.

Figure 6 illustrates an assembly of two inside link plates and segmental bushings.

Figure 7 is a view similar to Figure 2 illustrating a modification of my invention.

The particular multi-strand chain illustrated in the drawings is of the two-strand type, although any number of strands may be employed.

Referring to Figure 3, it will be seen that the chain comprises outside strands of links 8 and 9, and an inside strand of links 10, the outside strand 8 comprising a single strand of overlapping link plates 11 and 12, the outside strand 9 comprising a single strand of overlapping link plates 13 and 14, and the inside strand comprising a double strand of overlapping link plates 15 and 16. The number of link plates employed in the strands may be altered to suit load conditions.

The links thus formed are connected by means of pintles 17 each comprising a pin 18 and segmental bushings 19.

The pin 18 has a convex tooth contacting surface 18a and a convex bushing contacting surface 18b. The bushing 19 has a convex tooth contacting surface 19a and a concave surface 19b acting as a seat for the surface 18b of the pin. The radii of the surfaces 18a and 18b of the pin are the same as the radii of the surfaces 19a and 19b respectively of the bushing, and therefore when the pin and bushing are seated together the outside surfaces 18a and 19a are concentric.

The pintles are so arranged in the assembled chain that the tooth contacting surfaces 18a of the pins of every other joint face in one direction, and that the tooth contacting surfaces of the pins of the remaining joints face in the opposite direction. The same is true of the segmental bushings, it being noted that the tooth contacting surfaces 19a of the bushings face oppositely to the tooth contacting surfaces of their associated pins.

Referring to Figures 2, 3, and 6, it will be seen that the segmental bushings 19 are secured between the pairs of spaced link plates 12 and 16 of one strand of the chain and between the pairs of spaced link plates 14 and 16 of the other strand of the chain. These segmental bushings are preferably secured in place by means of a force fit in suitable apertures 20 provided in the link plates. The pins 18 are rigidly secured in the outside link plates 11 and 13 which overlap the link plates carrying the bushings 19. These pins may be secured in place by means of a force fit in suitable apertures 21 provided in the link plates 11 and 13 (see Figure 5) although it is preferable to rivet the ends of the pins over as indicated at 22.

The central link plates 15 are provided with apertures 23 of such shape that the links may be freely assembled on the pins 18. The pins 18 are provided with spaced notches 24 so that the cross section of the pins at the notches is as shown in Figure 5. The apertures 21 in the outside link plates correspond in configuration to the cross section of the pin at these notches so that the pin cannot turn with respect to the outside link plates. The intermediate notches 24 are so located on the pins that the link plates 16 register therewith and the apertures 20 of these link plates are of a configuration to provide sufficient clearance to permit proper artitculation of the joints.

Referring to Figures 3 and 6 in connection with the manner of building up and assembling the chain, it is pointed out that the pins 18 are pressed in the row of outside links 11, and the segmental bushings are pressed in place between the pairs of link plates 12 and 16, and 14 and 16. One set of assemblies such as shown in Figure 6 is slipped on to the pins 18, then a double row of link plates 15 is slipped on to the pins, then the other set of assemblies corresponding to the first set is slipped on to the pins, then the outside set of link plates 13 are pressed in place, and finally the ends of the pins are riveted over.

The chain thus provided is unusually quiet in its operation on the sprocket wheels due to the novel construction and arrangement of the joints, the construction being such that under no condition—whether the chain be going on or off either the driving or driven sprocket—is there any turning effect of any engaging pintle part against a working face of the sprocket teeth.

Referring to Figure 1 and assuming that the wheels A and B are driving and driven sprockets respectively, rotating in the direction of the arrows, the tooth 25 of the sprocket wheel A engages the surface 19a of the segmental bushing 19 of the joint a under load and the load is transmitted to the associated pin 18 and from this pin to the pin 18 of the following joint b. Since the link c which carries the bushing 19 referred to is seated home in the sprocket wheel there is no turning movement of the bushing, and, therefore, no turning or rubbing of the bushing on the tooth 25 under load.

As the sprocket wheel continues to rotate, the tooth 25a contacts with the surface 18a of the pin 18 of the joint b under load and the load is transmitted to the associated bushing 19 and from this bushing to the bushing 19 of the following joint d. During this period of rotation, articulation takes place in the joint a but since the link c is seated home it is the pin 18 of the joint a which turns. The load, however, is taken by the bushing 19 of the joint a and therefore the associated pin 18 is free to turn with no load contact with the adjacent sprocket tooth. The same is true when the joint b reaches the position of the joint a for then the bushing 19 is free to turn because the load is being taken by the pin.

Similarly at the driven sprocket wheel the member of the joint which rotates as articulation takes place is not in load contact with the sprocket wheel. For example, the bushing 19 of the joint e is in load contact with the tooth while the pin 18 of the joint e turns freely and without load contact with the tooth 26a.

Although I have described above the action of the chain on entering the driving sprocket and on leaving the driven sprocket, it is pointed out that similar action takes place as the chain leaves the driving sprocket and enters the driven sprocket.

In the modification illustrated in Figure 7, I employ a tubular roller 27 in surrounding relation to the pintle parts 18 and 19, which roller is mounted between the link plates for free rotation. The wheel C is a driving sprocket and is shown as rotating in the direction of the arrow. The arrangement is one in which wear on the inside of the tubular roller 27 is minimized, thus greatly reducing noise due to rattling or buzzing of the rollers on the pintle parts. In this connection it is pointed out that whether the sprocket be a driving sprocket or a driven sprocket, or whether the chain be entering or leaving the sprockets, there is no movement under pressure between a moving member of any joint of the chain and the roller. The entire load and movement of the joint parts during articulation takes place between the convex portions 18b of the pins and the corresponding concave portions 19b of the segmental bushings, which means that the bearing surfaces are the same in every joint throughout the chain and that the bearing load per unit of area in each joint is the same at any place relative to the sprockets while the chain is operating under the same condition.

Referring to the joint f in Figure 7, it will be seen that the load of the tooth 28 is taken by the tubular roller 27, transmitted to the segmental bushing 19 and from thence to the pin 18 through the surfaces 18b and 19b. During articulation the segmental bushing 19 of the joint f does not rotate with respect to the tubular roller 27, and therefore there will be no wear between the outside surface of the segmental bushing and the inside surfaces of the hollow bushing. The pin 18, however, rotates with respect to the bushing, but since there is no load being transmitted from this pin to the tubular roller through the surface 18a, there will be no wear on the inside surface of the roller 27. This action will be clear by following the motion of the joint parts during movement of the link 29 from the full line position shown in Figure 7 to the dot-and-dash position shown at 29a, it being pointed out that the pins 18 are rigidly carried by the links 29 and that the segmental bushings 19 are rigidly carried by the links 30. In this figure, the clearances at 31 and 32 are shown exaggerated.

I claim:—

1. In combination, a drive chain, and driving and driven sprocket wheels over which the chain passes, said chain including overlapping link plates arranged in spaced strands, and joints connecting said link plates, each joint having a pin and a segmental bushing, the pins being non-rotatively carried by and serving as spacers for the plates of every other link, the bushings being non-rotatively carried by and serving as spacers for the plates of the remaining links, said pins having convex surfaces adapted for tooth engagement, the pins of each link being arranged with the convex surfaces faced away from each other, said bushings having convex surfaces adapted for tooth engagement, the bushing of each link being arranged with the convex surfaces faced away from each other, and the convex surfaces of the pins and bushings of each joint being concentric.

2. In a power transmission chain adapted to run over sprocket wheels, the combination of links comprising overlapping link plates arranged in spaced strands, and joints connecting the links, each joints having a part secured to one set of links provided with a concave surface and a part secured to the adjacent set of links provided with a convex surface coacting with the concave surface of the other part, said parts having concentric outside convex surfaces exposed in the space between the strands of link plates adapted for direct contact with the teeth of the sprocket wheels.

3. In a power transmission chain, the combination of links comprising overlapping link plates arranged in spaced strands, friction joints connecting the links each comprising a pin and a segmental bushing, the pin having a convex surface of a radius corresponding to the radius of the inside concave surface of the bushing, and a second convex surface of a radius corresponding to the radius of the outside convex surface of the bushing, said surfaces being connected by shoulders whereby pockets are formed between the shoulders of the pins and the edges of the bushings which vary in size as the chain articulates, and freely rotatable tubular rollers surrounding said joints in the space between strands.

4. In a power transmission chain, the combination of links comprising overlapping link plates arranged in spaced strands, friction joints connecting the links each comprising a pin and a segmental bushing associated with the pin, said pin and bushing having surfaces forming pockets in the joints which vary in size as the chain articulates, and freely rotatable rollers surrounding said joints in the space between strands.

5. A drive chain comprising inside and outside links, two-part friction joints connecting the links, one part of each joint being in the form of a pin secured in the outside links to space them apart and the other part being in the form of a segmental bushing secured in the inside links to space them apart, and a roller surrounding each joint for free rotation thereon.

In testimony whereof I have hereunto signed my name.

DAVID BARNES PERRY.